Nov. 5, 1929.                H. K. HITCHCOCK                1,734,379
              APPARATUS FOR MAKING COMPOSITE GLASS
                       Filed Feb. 20, 1928
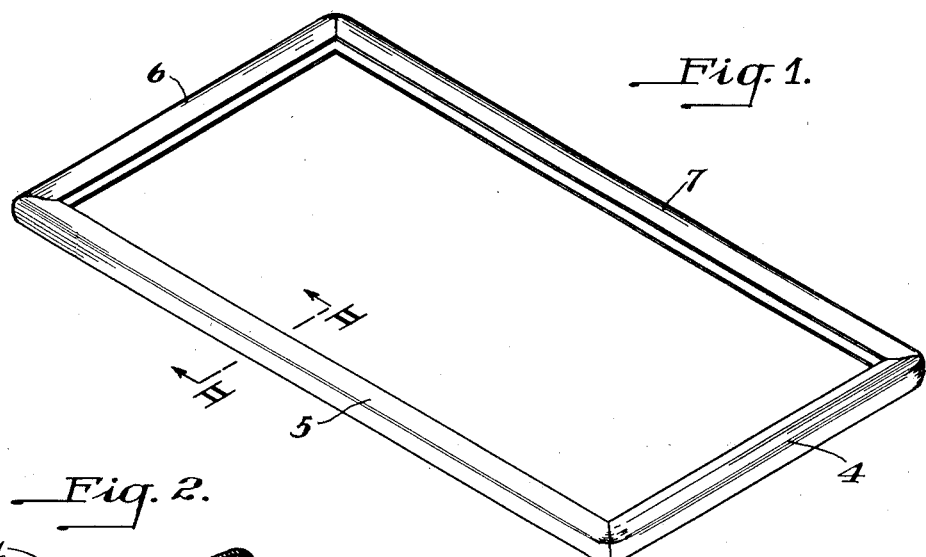
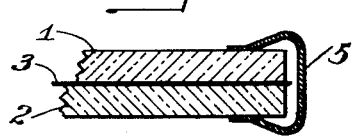
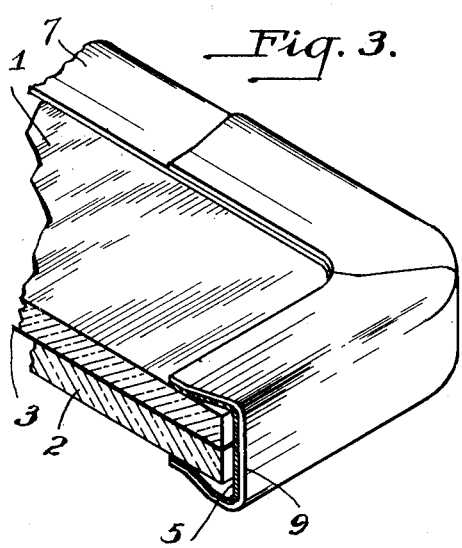
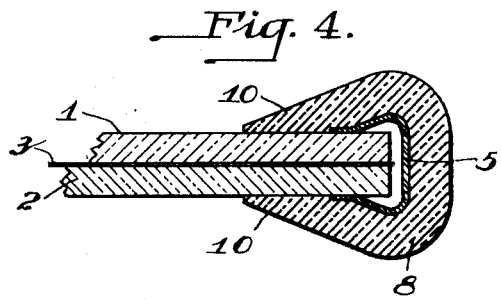
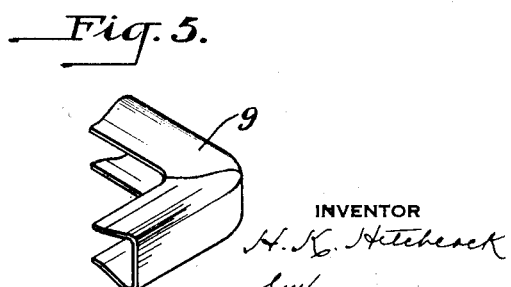
INVENTOR
H. K. Hitchcock
by
James C. Bradley
atty Patented Nov. 5, 1929

1,734,379

UNITED STATES PATENT OFFICE

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA

APPARATUS FOR MAKING COMPOSITE GLASS

Application filed February 20, 1928. Serial No. 255,587.

The invention relates to apparatus for making composite glass wherein heat and pressure are applied to cause a joinder between the glass and celluloid. Composite glass ordinarily comprises two sheets of glass with a sheet of celluloid or equivalent material cemented therebetween, although a greater number of sheets may be employed. It is the practice to assemble the sheets with a coating of cement, such as gelatin, dried upon the surfaces of the glass sheets which are to be cemented to the celluloid, the heat subsequently applied serving to soften the gelatin and secure adhesion when pressure is applied. The present invention has for its primary objects the provision of improved means for securing the series of sheets together, preliminary to the heating and pressing operation, so that such sheets are firmly held in assembled position, and so that the lines of joinder between the plates at the margins thereof are protected against the application of fluid pressure, the present construction constituting a further development of the invention disclosed in the application of W. G. Lytle, Serial No. 252,205. One embodiment of the invention is illustrated in the accompanying drawings, wherein:

Figure 1 is a perspective view of the assembled apparatus, but with the corner clips and rubber edge strip not yet applied. Fig. 2 is a section on the line II—II of Fig. 1. Fig. 3 is a perspective view, partly in section showing the assembled parts at one corner. Fig. 4 is a section similar to that of Fig. 2, but after the flexible edge member of rubber has been applied. And Fig. 5 is a perspective view of one of the corner clips.

In carrying out the process, the sheets to be joined together are assembled, as indicated in Fig. 2, wherein 1 and 2 are glass sheets and 3 is the interposed sheet of celluloid or other similar material. These plates have been previously treated to prepare them for the pressing operation, such treatment involving the cleaning of the glass and celluloid sheets and the application to one side of each of the glass sheets of a thin film of gelatin or other cement. This cement is of such a character that when the celluloid sheet is placed between the two sheets of glass and heat and pressure applied thereto, the cement will be softened and the sheets will be securely attached together when the composite plate is cooled off, it being desirable that this cooling off should occur while the sheets are under pressure. If gelatin is used as a cement, the heat applied will ordinarily be about 250 degrees F. and the pressure about 150 pounds per square inch. The temperature specified is sufficient to slightly soften the celluloid so that the opposing faces of the celluloid and glass are brought into intimate contact. In carrying out the pressing operation, the assembled sheets are placed in a tank and hydraulic pressure is applied, heated liquid being used, so that the liquid as thus applied not only gives the desired degree of pressure, but also provides a medium for softening the gelatin so that the sheets are heated and pressed at one operation. Under these conditions, it is, of course, necessary that the pressure should be applied to the outer faces of the sheets to be joined, but not to the edges of the sheets where they come into contact, since fluid pressure applied at the lines of joinder between the sheets would penetrate the joints and tend to separate the sheets, so that the pressure on the faces of the sheets would be ineffective to secure the desired result.

The means employed for preventing the application of fluid pressure to the juncture between the sheets will be readily seen by reference to the drawings. This means comprises the clamping strips 4, 5, 6 and 7 of spring metal, U-shape in cross section and the sealing strip 8 of rubber. The clamping strips 4, 5, 6 and 7 each correspond in length to one of the sides of the sheets to be secured together and in applying the strips, the flanges thereof must be sprung apart in order to apply them to the sheets, as indicated in Fig. 2. The spring pressure of these clamping strips serves to hold the sheets securely together and prevent them from slipping relatively to each other while the assembled sheets are being handled and placed in the hydraulic press. In order to make the construction more secure at the corners, the spring corner clips 9 are employed, such clips being similar in cross section to the clamping strips and being adapted to fit around the clamping strips where they meet at the corners of the sheets, the parts being shown in assembled relation in Fig. 3. The rubber sealing strip 8 has a cross section, as indicated in Fig. 4, the edges 10, 10 being tapered in order to make them more flexible and give a better engagement with the outer faces of the glass sheets 1 and 2. The sealing strip 8 is of such size or length that in applying it to the assembled sheets, it must be stretched considerably, so that when in position, it tightly engages the clamping strips and the outer faces of the glass sheets.

After the parts are assembled, as indicated in Figs. 3 and 4, they are placed in the hydraulic tank with a number of other assembled plates and suction is applied to the tank to exhaust the air from the space inside the sealing strips and to cause the lips 10, 10 of such strips to tightly engage the outer faces of the glass sheets. This insures that when hydraulic pressure is applied to the tank, there will be no leakage to the interior of the sealing strips, so that fluid pressure is excluded from the joints between the sheets. After the exhausting operation, heated liquid under pressure is applied to the tank and the composite plates in this manner subjected to the necessary heat and pressure. As indicated in Figs. 2 and 4, the clamping strips engage the outer faces of the sheets 1 and 2 at a substantial distance inward from the extreme edges of the sheets. This arrangement tends to prevent the celluloid from being squeezed out around the edges of the sheets such as would be the case if the clamping strips applied their pressure at the extreme edges of the sheets. As set forth in the Lytle application heretofore referred to, it is desirable that this thinning and squeezing out of the celluloid at the edges of the sheets should be avoided, and the present construction accomplishes this function.

What I claim is:

1. In combination in apparatus for use in securing together a set of sheets of similar size arranged in a pile with their edges flush to form a plate of composite glass, strips of sheet metal U-shape in cross section extending around the edges of the sheets and applying yielding pressure to clamp them together, and a strip of flexible sealing material of general U-shape in cross section fitting over the sheet metal strips with its edges free and in engagement with the outer faces of the outer sheets for a substantial distance inward past the inner edges of said sheet metal strips.

2. In combination in apparatus for use in securing together a set of sheets of similar size arranged in a pile with their edges flush to form a plate of composite glass, strips of sheet metal U-shape in cross section extending around the edges of the sheets and applying yielding pressure to clamp them together, corner members, also of sheet metal, fitting around the ends of the strips where they meet at the corners of the sheets, and a strip of flexible sealing material of general U-shape in cross section fitting over said strips and corner members with its edges free and in engagement with the outer faces of the outer sheets for a substantial distance inward past the inner edges of said sheet metal strips.

3. In combination in apparatus for use in securing together a set of sheets of similar size arranged in a pile with their edges flush to form a plate of composite glass, strips of sheet metal U-shape in cross section extending around the edges of the sheets and applying yielding pressure to clamp them together, means for securing the strips releasably together where they meet at the corners of the sheets, and a strip of flexible sealing material of general U-shape in cross section fitting over the sheet metal strips with its edges free and in engagement with the outer faces of the outer sheets for a substantial distance inward past the inner edges of said sheet metal strips.

4. In combination in apparatus for use in securing together a set of sheets of similar size arranged in a pile with their edges flush to form a plate of composite glass, strips of sheet metal U-shape in cross section extending around the edges of the sheets and applying yielding pressure to clamp them together, and each substantially coextensive in length with that of the sheet edge along which it extends, and a strip of flexible sealing material of general U-shape in cross section fitting over the sheet metal strips with its edges free and in engagement with the outer faces of the outer sheets for a substantial distance inward past the inner edges of said sheet metal strips.

5. In combination in apparatus for use in securing together a set of sheets of similar size arranged in a pile with their edges flush to form a plate of composite glass, strips of sheet metal U-shape in cross section extending around the edges of the sheets and applying yielding pressure to clamp them together and each substantially coextensive in length with that of the sheet edge along which it extends, means for securing the strips releasably together where they meet at the corners of the sheets, and a strip of flexible sealing material of general U-shape in cross section fitting over the sheet metal strips with its edges free and in engagement with the outer faces of the outer sheets for a substantial distance inward past the inner edges of said sheet metal strips.

6. In combination in apparatus for use in securing together a set of sheets of similar size arranged in a pile with their edges flush to form a plate of composite glass, strips of sheet metal U-shape in cross section extending around the edges of the sheets and applying yielding pressure to clamp them together, and a strip of flexible sealing material of general U-shape in cross section fitting over the sheet metal strips with its edges in engagement with the outer faces of the outer sheets for a substantial distance inward past the inner edges of said sheet metal strips, said sheet metal strips having the edges only of their flanges in engagement with the glass sheets with the portions of such flanges back of the edges curved outward so that they do not engage the glass.

In testimony whereof, I have hereunto subscribed my name this 16th day of Feb., 1928.

H. K. HITCHCOCK.